United States Patent [19]
Popek et al.

[11] Patent Number: 5,351,989
[45] Date of Patent: Oct. 4, 1994

[54] INFLATOR ASSEMBLY

[75] Inventors: Joseph C. Popek, Detroit; William F. McLeod, Roseville, both of Mich.

[73] Assignee: TRW Vehicle Safety Systems Inc., Lyndhurst, Ohio

[21] Appl. No.: 982,857

[22] Filed: Nov. 30, 1992

[51] Int. Cl.⁵ .............................................. B60R 21/26
[52] U.S. Cl. ........................................ 280/737; 222/5; 280/740
[58] Field of Search ............... 280/740, 736, 737, 741; 222/3, 5; 102/530, 531, 272, 273

[56] References Cited

U.S. PATENT DOCUMENTS

| | | |
|---|---|---|
| Re. 28,624 | 11/1975 | Lewis et al. . |
| 3,663,036 | 5/1972 | Johnson . |
| 3,723,205 | 3/1973 | Scheffee .................. 280/741 |
| 3,744,816 | 7/1973 | Yamaguchi et al. ............ 280/737 |
| 3,758,131 | 9/1973 | Stephenson et al. . |
| 3,773,353 | 11/1973 | Trowbridge et al. . |
| 3,774,807 | 11/1973 | Keathley et al. . |
| 3,806,153 | 4/1974 | Johnson . |
| 3,966,266 | 6/1976 | Roth . |
| 4,981,534 | 1/1991 | Scheffe . |
| 5,033,772 | 7/1991 | Frantom et al. . |
| 5,060,974 | 10/1991 | Hamilton et al. . |
| 5,076,607 | 12/1991 | Woods et al. . |
| 5,078,422 | 1/1992 | Hamilton et al. . |
| 5,131,680 | 7/1992 | Coultas et al. ............ 280/737 |
| 5,221,109 | 6/1993 | Marchant ............... 102/530 |
| 5,242,194 | 9/1993 | Popek .................. 280/737 |

FOREIGN PATENT DOCUMENTS 4231556  4/1993  Fed. Rep. of Germany ...... 280/736

*Primary Examiner*—Eric Culbreth
*Attorney, Agent, or Firm*—Tarolli, Sundheim & Covell

[57] ABSTRACT

An apparatus (10) for use in inflating a vehicle occupant restraint includes a storage chamber (22b) which stores a gas under pressure, and an ignitable material (46b) which produces combustion products when burning. The ignitable material (46b) is contained in a combustion chamber (108b). The combustion chamber (108b) communicates with the storage chamber (22b) before the ignitable material is ignited. The combustion chamber (108b) is closed and isolated from the storage chamber (22b) when the ignitable material (46b) is burning. A burst disk (200) is ruptured by the combustion products in the combustion chamber (108b) to permit passage of the combustion products into the storage chamber (22b) when the combustion products reach a predetermined elevated pressure.

7 Claims, 5 Drawing Sheets

5,351,989

INFLATOR ASSEMBLY

FIELD OF THE INVENTION

The present invention relates to an apparatus for use in inflating a vehicle occupant restraint, such as an air bag.

BACKGROUND OF THE INVENTION

An inflator assembly for inflating an air bag is disclosed in U.S. Pat. No. 3,723,205. The inflator assembly disclosed in the '205 patent includes a container which holds a gas under pressure. When the air bag is to be inflated, a squib is electrically actuated to ignite a gas generating material. As the gas generating material burns, the pressure in the container is increased due to the gases and heat provided by burning of the gas generating material. When a predetermined pressure is reached, a burst disk is ruptured to enable gas to flow from the container to the air bag.

An inflator assembly for inflating an air bag is also disclosed in U.S. Pat. No. 5,131,680. The '680 patent discloses a body of ignitable pyrotechnic material which is disposed within a container in which gas is stored. An igniter assembly is actuatable to ignite the pyrotechnic material. The igniter assembly includes an ignition material which rapidly burns at a relatively high temperature to generate heat and flame which initiate burning of the body of pyrotechnic material.

In the inflator assembly of the '680 patent, an actuator assembly is operable to actuate the igniter assembly and to rupture a burst disk to release a flow of gas from the container. The actuator assembly includes a pyrotechnic charge which, when ignited, generates pressure against the head end portion of a piston to move the piston. The moving piston ruptures the burst disk and strikes the igniter assembly to ignite the ignition material of the igniter assembly. The ignition material, in turn, ignites the body of pyrotechnic material disposed in the container. As the body of pyrotechnic material in the container burns, flame and hot combustion products enter the container and both heat and supplement the stored gas.

SUMMARY OF THE INVENTION

In accordance with the present invention, an apparatus for use in inflating a vehicle occupant restraint comprises means for defining a storage chamber, an ignitable material, and an actuator means. The storage chamber stores gas under pressure. The actuator means ignites the ignitable material. The apparatus also includes means for defining a combustion chamber in which the ignitable material is located. A passage means communicates the combustion chamber with the storage chamber before the ignitable material is ignited. A blocking means blocks communication of the combustion chamber with the storage chamber when the ignitable material is burning.

In a preferred embodiment of the present invention, the ignitable material, when burning, produces combustion products. The passage means includes an opening for communicating the combustion chamber with the storage chamber. The blocking means includes a rupturable metal burst disk which covers the opening to block the passage of the combustion products through the opening. The burst disk ruptures to permit the combustion products to flow through the opening and into the storage chamber when the combustion products reach a predetermined elevated pressure.

In the preferred embodiment, the passage means further includes a passage which communicates the combustion chamber with the storage chamber before the ignitable material is ignited. The blocking means further includes a piston which is movable from a retracted position to an extended position. The piston blocks the flow of the combustion products from the combustion chamber to the storage chamber through the passage when the piston is in its extended position.

An inflator assembly constructed in accordance with the present invention heats and supplements the stored gas when the combustion products from the ignitable material enter the storage chamber. The combustion products enter the storage chamber at a relatively high temperature and pressure because they are contained in the combustion chamber until the pressure in the combustion chamber is great enough to rupture the burst disk.

BRIEF DESCRIPTION OF THE DRAWINGS

The foregoing and other objects and features of the present invention will become more apparent to one skilled in the art upon reading the following description of the invention with reference to the accompanying drawings, in which.

DESCRIPTION OF PREFERRED EMBODIMENTS OF THE INVENTION

General Description

Figure 1:
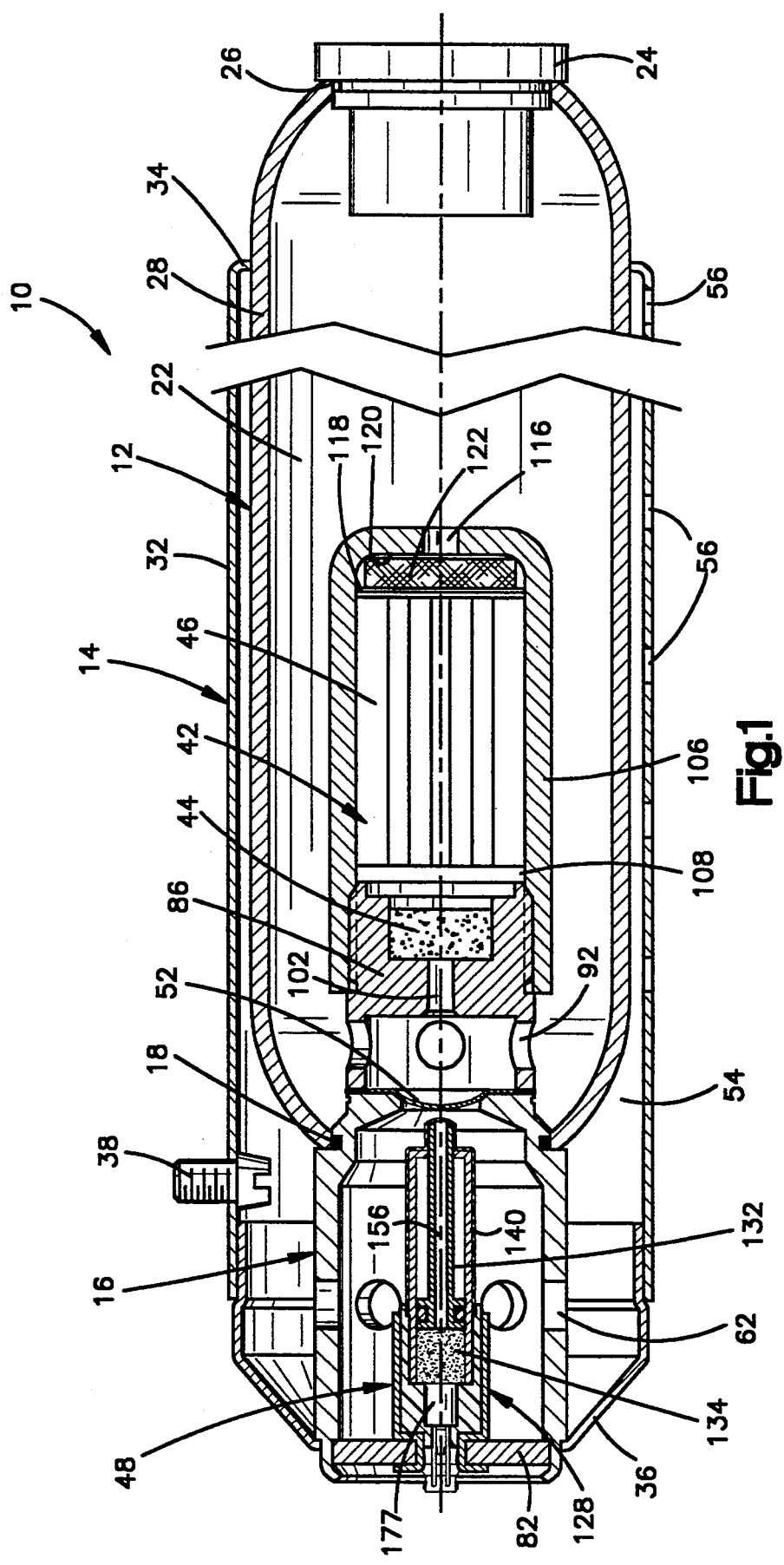
FIG. 1 is a sectional view of an inflator assembly which is constructed in accordance with the present invention.

An inflator assembly 10 (FIG. 1) inflates a vehicle occupant restraint, such as an air bag. The inflator assembly 10 includes a generally cylindrical container 12, a generally cylindrical diffuser 14, and a manifold assembly 16. The manifold assembly 16 is secured to one end of the container 12 by a friction weld 18 and projects both axially into and axially away from the container. The diffuser 14 is larger in diameter than the container 12 and is mounted to encircle both the container and the manifold assembly. The diffuser 14 also extends substantially the entire length of the manifold assembly 16 and a significant portion of the length of the container 12.

The container 12 defines a generally cylindrical chamber 22. The chamber 22 is filled with gas under pressure which is introduced into the chamber through an end cap 24. The end cap 24 extends through an opening at an end of the container 12 opposite from the manifold assembly 16 and is connected to the container 12 by a friction weld 26. The end cap 24 includes a passage (not shown) through which the gas is conducted into the chamber 22. Once the chamber 22 has been filled with gas at a desired pressure, the passage is closed. The end cap 24 also includes a conventional pressure switch (not shown) from which gas pressure in the chamber 22 can be monitored to alert a passenger in a vehicle if the pressure in the chamber 22 drops below a set pressure.

The stored gas is preferably argon. The argon gas is preferably stored in the container 12 at a pressure of approximately 2,000 to 3,500 psi. The container 12 could, however, store other gases at different pressures. For example, the container 12 could store air or nitrogen.

The container 12 includes a generally cylindrical one-piece steel wall 28 which defines the chamber 22. The one-piece steel wall 28 may have a length of approximately 230 millimeters, an outside diameter of approximately 59 millimeters, and a thickness of approximately 2.5 millimeters. It should be understood that the foregoing specific dimensions for the wall 28 are set forth for purposes of clarity of description only. The inflator assembly 10 may be constructed with dimensions and materials which are substantially different from the foregoing.

The diffuser 14 is mounted on the outside of the container 12. The diffuser 14 includes a cylindrical diffuser tube 32 having an annular, radially inwardly directed lip 34 at one end. The lip 34 tightly engages a cylindrical outer side surface of the wall 28. An end cap 36 is welded to the end of the diffuser tube 32 opposite from the inturned lip 34. The end cap 36 is connected to an outer end portion of the manifold assembly 16. A mounting stud 38 is connected with the diffuser tube 32 adjacent the end cap 36. The mounting stud 38 is used to mount the inflator assembly 10 to a reaction can which can be mounted at a desired location in a vehicle.

The manifold assembly 16 extends through the wall 28 of the container 12 at the end of the container opposite the end cap 24. The portion of the manifold assembly 16 within the container 12 supports ignitable pyrotechnic material 42. In the embodiment of the invention illustrated in FIG. 1, the ignitable pyrotechnic material 42 includes a booster charge 44 and a body 46 of pyrotechnic material. The portion of the manifold assembly 16 outside the container 12 supports an actuator assembly 48. Between the actuator assembly 48 and the booster charge 44 is a metal burst disk 52 which seals the container 12.

Upon the sensing of sudden vehicle deceleration, the actuator assembly 48 is actuated to release the stored gas from the chamber 22 and to ignite the booster charge 44 and the body 46 of pyrotechnic material. When actuated, the actuator assembly 48 ruptures the burst disk 52 to release the stored gas from the chamber 22. Thereafter, the actuator assembly 48 ignites the booster material 44, which in turn ignites the body 46 of pyrotechnic material. As the body 46 of pyrotechnic material burns, the gas in the chamber 22 is heated and added to by the hot gases produced by the combustion of the body 46 of pyrotechnic material, thereby increasing the pressure of the gas.

Upon rupturing of the burst disk 52, gas flows from the chamber 22 through the manifold assembly 16. The gas flows from the manifold assembly 16 into a chamber 54 formed by the diffuser 14 and the outer walls of the manifold assembly and the container 12. The diffuser 14 has openings 56 through which the gas is directed to the air bag.

Manifold Assembly

The manifold assembly 16 (FIG. 2) includes a generally cylindrical metal manifold plug 58 which is disposed partially outside of the container 12. The manifold plug 58 is hollow and has a generally cylindrical interior cavity 60. Circular outlet openings 62 are disposed in a circular array in a cylindrical side wall 64 of the manifold plug 58. One end of the manifold plug 58 extends through the container wall 28 from outside of the container 12 and is friction welded to the wall 28 at the weld 18.

The burst disk 52 extends across a circular opening 66 at the end of the manifold plug 58 which is presented to the interior of the container 12. The burst disk 52 is secured to the manifold plug 58, and blocks a flow of gas from the chamber 22 until the burst disk 52 is ruptured by the actuator assembly 48. The burst disk 52 has a circular domed or bulged central portion 70. The central portion 70 is preferably divided into six equal segments 72 by score lines which extend radially outward from the center of the burst disk 52. When the burst disk 52 is ruptured, the segments 72 (FIG. 3) tend to flatten axially outwardly against a frustoconical inner side surface 74 of the manifold plug 58 and form a relatively large opening 80 (FIG. 3) in the burst disk 52.

The outer end of the manifold plug 58 (FIG. 2) is closed by a circular end wall 82. The actuator assembly 48 is mounted on the end wall 82. The end wall 82 supports the actuator assembly 48 with its longitudinal central axis coincident with central axes of the manifold plug cavity 60, the circular opening 66, and the burst disk 52. The diameter and length of the actuator assembly 48 are sufficiently smaller than the diameter and length of the cavity 60 that gas can flow from the chamber 22 and through the cavity 60 to the openings 62 when the burst disk 52 is ruptured.

The manifold assembly 16 also includes a hollow cylindrical metal holder 86 (FIG. 3) which is coaxial with the manifold plug 58 and is disposed in the container 12. The holder 86 is tungsten inert gas (TIG) welded to the burst disk 52 and thus to the inner end of the manifold plug 58. The circular burst disk 52 has a flat annular rim portion 88 which extends between the inner end of the manifold plug 58 and the outer end of the holder 86. The manifold plug 58, holder 86 and rim portion 88 of the burst disk 52 are all tungsten inert gas welded together to form the unitary manifold assembly 16.

A plurality of circular inlet openings 92 (FIGS. 2 and 3) are arranged in a circular array in a side wall 94 of the holder 86. The openings 92 provide fluid communication between the chamber 22 and a generally cylindrical cavity 96 in the holder 86. The burst disk 52 blocks fluid flow from the cavity 96 into the manifold plug 58 until the burst disk is ruptured by the actuator assembly 48.

The booster charge 44 (FIG. 3) is disposed in a cylindrical chamber 98 formed in the end of the holder 86 opposite the burst disk 52. Prior to operation of the actuator assembly 48, the chamber 98 is connected in fluid communication with the chamber 96 through a generally cylindrical opening 102. The chamber 98 and opening 102 are coaxial with the burst disk 52 and the actuator assembly 48. Although the opening 102 has a generally cylindrical configuration, the opening has a slight inward taper from a wide end portion adjacent to the cavity 96.

Ignitable Material

Figure 3:
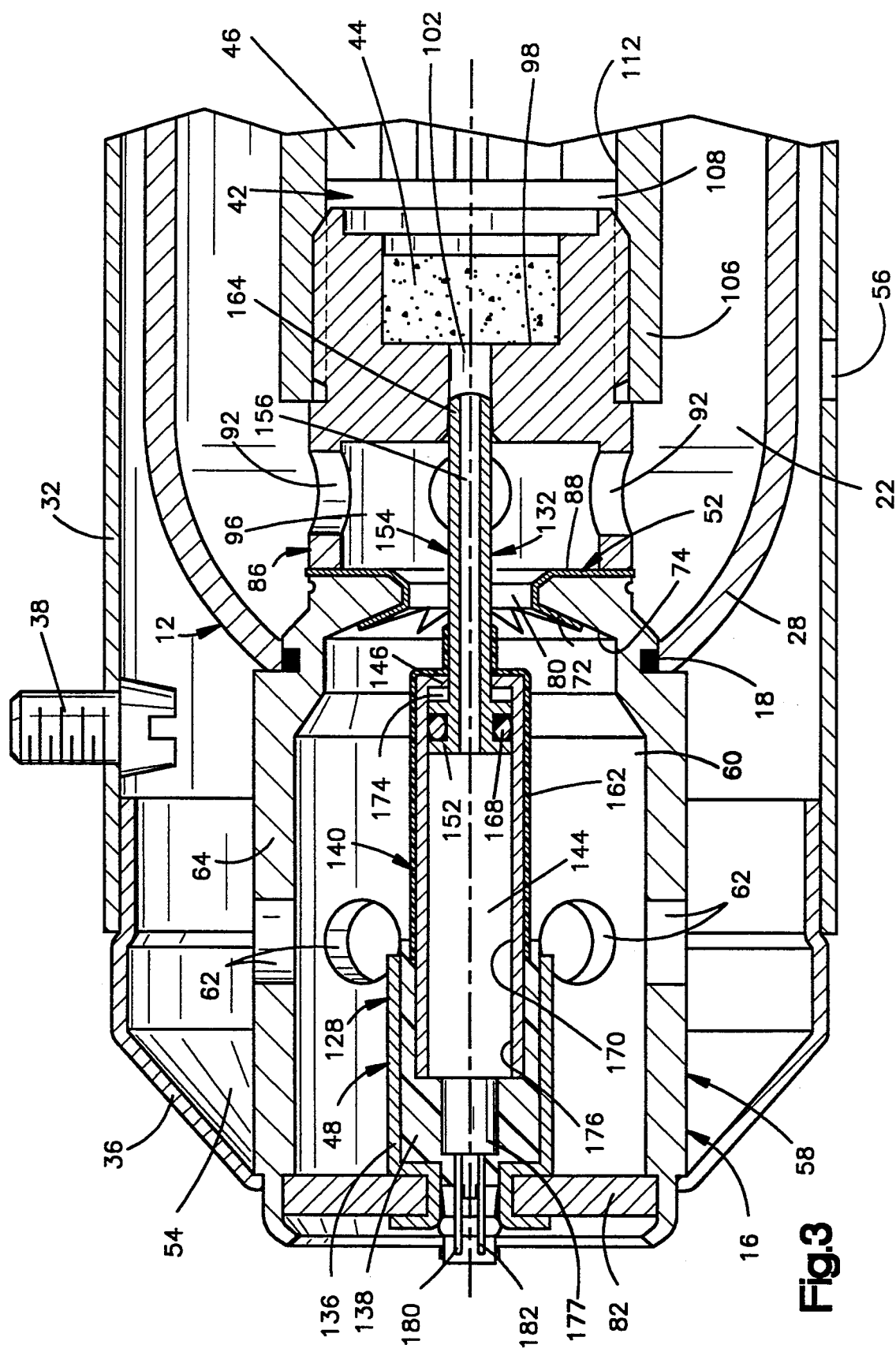
FIG. 3 is an enlarged partial sectional view similar to FIG. 2 but illustrating parts in a different position.

As noted above, the ignitable material 42 includes the booster charge 44 and the body 46 of pyrotechnic material, which are disposed in a coaxial relationship (FIG. 3). The booster charge 44 is readily ignitable to ignite the body 46. The booster charge 44 is securely held in the chamber 98 and is enclosed by a thin covering of polymeric material (not shown) which is destroyed upon burning of the booster charge. The ignitable material forming the booster charge 44 is preferably boron potassium nitrate ($BKNO_3$), but could have a different composition if desired.

Upon operation of the actuator assembly 48, the booster charge 44 is ignited through the central opening 102 in the holder 86. The booster charge 44 rapidly burns at a relatively high temperature to generate heat and flame which initiate burning of the body 46 of pyrotechnic material.

A generally cylindrical metal housing 106 encloses the body 46 of pyrotechnic material. One end of the housing 106 is disposed adjacent the holder 86 and has a threaded, interior circumferential surface. The threaded surface of the housing 106 engages a threaded, exterior circumferential surface on the holder 86 to mount the housing on the inner end of the holder. The housing 106 is coaxial with the chamber 98 and the booster charge 44 in the holder 86.

The body 46 of pyrotechnic material is disposed in a cylindrical chamber 108 within the housing 106 (FIG. 3). The body 46 of pyrotechnic material has a three-lobed cross sectional configuration. The lobes extend throughout the axial extent of the body. Straight cylindrical passages (not shown) extend parallel to each other and axially through respective lobes in the body 46. The lobes of the body 46 have an interference fit with a cylindrical inner side surface 112 of the housing 106 to support the body 46 firmly in the cylindrical housing chamber 108.

By providing the body 46 of pyrotechnic material with internal passages, the body 46 will have a slightly progressive burn characteristic. Specifically, as the pyrotechnic material forming the body 46 is burned, the rate of generation of heat and gas slightly increases. This is because, as the body 46 burns, the total surface area of the body which is burning increases slightly. The area of the outer side surface of the body 46 decreases while the area of the surfaces of the passages increases. The body 46 could be configured to have different burning characteristics if desired.

At its end opposite from the manifold assembly 16 (FIG. 1), the housing 106 is substantially closed except for a circular orifice 116. The orifice 116 is disposed in a coaxial relationship with the housing chamber 108 and the body 46 of pyrotechnic material. The inside of the housing chamber 108 is connected by the orifice 116 in fluid communication with the chamber 22 in the container 12 (FIG. 1). The orifice 116 is continuously open so that the gas which is stored in the chamber 22 can flow into the housing chamber 108 around the body 46.

Disposed between the body 46 of pyrotechnic material and the orifice 116 are a flat baffle plate 118 (FIG. 1), a circular screen 122, and a flat circular orifice plate 120 through which an orifice (not shown) extends. During burning of the body 46, a flow of combustion products from the pyrotechnic material of the body 46 impinges against the baffle plate 118. The baffle plate 118 provides a tortuous path in the housing 106 for the combustion products, and thus some particles may be trapped in the housing. After passing the baffle plate 118, the combustion products flow into the chamber 22 through the screen 122 (FIG. 1), the orifice plate 120 and the housing orifice 116. A flame is also conducted into the chamber 22 during burning of the body 46.

During initial burning of the body 46 of pyrotechnic material, an opening of relatively small area in the orifice plate 120 restricts the flow of combustion products from the housing chamber 108. This causes the pressure and temperature in the housing chamber 108 to increase in such a manner as to promote burning of the pyrotechnic material forming the body 46.

Although the body 46 of pyrotechnic material could have many different compositions, in one specific embodiment of the invention, the pyrotechnic material forming the body 46 had the following composition:

| % By weight | Ingredient |
| --- | --- |
| 73% | Potassium perchlorate |
| 8.7% | Dioctyl adipate |
| 6.6% | Polyvinyl chloride |
| 0.05% | Carbon Black |
| 0.15% | Stabilizers (Boron, Chromium) |
| 11.5% | Potassium nitrate |

Also, the body 46 of pyrotechnic material could have different sizes and shapes. The size and shape of the body 46 is the same as is more fully described in U.S. Pat. No. 5,131,680. The construction of the baffle plate 118, screen 122 and orifice plate 120 is also the same as is described in U.S. Pat. No. 5,131,680.

Actuator Assembly

The actuator assembly 48 (FIG. 2) is operable to rupture the burst disk 52 and to ignite the booster charge 44. The actuator assembly 48 includes a cylindrical housing 128 in which a piston 132 and a pyrotechnic charge 134 of ignitable material are disposed in a coaxial relationship. The housing 128 includes a generally cylindrical metal outer housing member 136, a cylindrical casing 138, and an inner housing member 140. The outer housing member 136 is secured to the end wall 82 of the manifold plug 58 and is disposed in a coaxial relationship with the burst disk 52, the booster charge 44 and the body 46 of pyrotechnic material. The casing 138 is disposed within the outer housing member 136 and extends around the cylindrical metal inner housing member 140. The casing 138 electrically insulates the metal inner housing member 140 from the metal outer housing member 136. As shown, the casing 138 is formed of glass reinforced nylon. However, the casing 138 may be made of a variety of engineered resins.

The inner housing member 140 forms a cylinder chamber 144 in which the piston 132 and the pyrotechnic charge 134 are disposed. The inner housing member 140 has an annular end flange 146 which defines a circular opening 148 to the cylinder chamber 144. The piston 132 is formed from a single piece of metal and has a cylindrical head end portion 152. A smaller-diameter cylindrical piston rod 154 extends axially away from the head end portion 152. A cylindrical central passage 156 is coaxial with and extends through the head end portion 152 and piston rod 154 of the piston 132. The cylindrical piston rod 154 has a pointed tip at its outer end portion 164, which extends through the opening 148.

A generally cylindrical end cap 162 partially encloses the outer end portion 164 of the piston rod 154 and the inner housing member 140. The cylindrical end cap 162 is vacuum formed of polypropylene and is installed over the inner housing member 140 and outer end portion 164 of the piston rod 154. The end cap 162 is bonded between the casing 138 and inner housing member 140. The end cap 162 blocks the piston passage 156 to prevent contaminants from entering the piston passage. Also, the end cap 162 electrically insulates the outer end portion of the metal inner housing member 140 and piston rod 154.

An annular O-ring 168 is disposed on the head end portion 152 of the piston 132. The O-ring 168 engages and seals against a cylindrical inner side surface 170 of the inner housing member 140. Together, the head end portion 152 and the O-ring 168 cooperate to divide the cylindrical chamber 144 into a rod end portion 174 and a head end portion 176.

The pyrotechnic charge 134 is disposed in the head end portion 176 of the cylinder chamber 144. A squib 177 is located adjacent the pyrotechnic charge 134. Two electrically conductive pins 180 and 182 are connected with the squib 177. The pins 180 and 182 extend through the casing 138, and through an opening in the end of the outer housing member 136 adjacent the wall 82. The pins 180 and 182 provide a path for electrical current to actuate the squib 177.

Although the pyrotechnic charge 134 could have many different compositions, in one specific embodiment of the invention, the pyrotechnic charge had the following composition:

| % By Weight | Ingredient |
| --- | --- |
| 72% | Boron potassium nitrate (BKNO$_3$) |
| 14% | Titanium hydride |
| 14% | Potassium perchlorate |

Operation

Upon the occurrence of sudden vehicle deceleration, a deceleration sensor (not shown) of known construction completes an electrical circuit to permit electrical current to flow to the pins 180 and 182 of the actuator assembly 48. The electrical current transmitted to the pins 180 and 182 causes the squib 177 to ignite the pyrotechnic charge 134. The hot combustion products generated by burning of the pyrotechnic charge 134 push against the head end portion 152 of the piston 132 to move the piston 132 in the cylinder chamber 144 from a retracted position shown in FIG. 2 to an extended position shown in FIG. 3.

As the piston 132 moves, the end cap 162 is ruptured by the outer end portion 164 of the piston rod 154. This rupture may occur where a portion of the end cap 162 overlies the outer end portion 164 of the piston rod 154. In addition, hot combustion products are conducted through the piston passage 156 to destroy the portion of the end cap 162 blocking the piston passage 156.

Movement of the piston 132 causes its rod end portion 154 to move through the circular opening 148. The outer end portion or tip 164 of the rod end portion 154 of the piston 132 strikes at or near the center of the burst disk 52. The force applied against the burst disk 52 by the pointy tip on the piston 132 ruptures the burst disk 52. The fluid pressure in the container 12 then deforms the burst disk 52 axially outwardly (FIG. 3) as the stored gas escapes from the chamber 22.

The gas in the container chamber 22 flows from the chamber 22 through the manifold inlet openings 92 to the chamber 96 in the holder 94. The gas then flows through the opening 80 in the burst disk 52 around the rod end portion 154 of the piston 132, and into the cavity 60 in the manifold plug 58. From the manifold plug cavity 60, the gas flows through the openings 62 into the diffuser chamber 54. The gas flows from the diffuser chamber 54 through the openings 56 (FIG. 1) to an air bag.

After rupturing the burst disk 52 (FIG. 3), the piston 132 continues to move axially under the influence of combustion products resulting from burning of the pyrotechnic charge 134. The piston 132 thus moves to its extended position shown in FIG. 3. The outer end portion 164 of the piston rod 154 moves into the generally cylindrical opening 102 in the holder 86 so that the piston rod and the holder are in a telescopic relationship. Hot combustion products resulting from burning of the pyrotechnic charge 134 are conducted through the piston passage 156 into the opening 102 in the holder 86. The hot combustion products flow and impinge against the leftward (as viewed in FIG. 3) end portion of the booster charge 44 and ignite the booster charge 44.

Upon ignition of the booster charge 44, the booster charge burns at a relatively high temperature to generate heat and flame which are directed toward the body 46 of pyrotechnic material. The heat and flame from burning the booster charge 44 are effective to ignite the body 46 of pyrotechnic material.

As the body 46 of pyrotechnic material begins to burn, hot combustion products and flame flow around the baffle plate 118 (FIG. 1), through the screen 122, through the orifice plate 120, and through the housing orifice 116 into the chamber 22 containing the stored gas. During burning of the body 46 of pyrotechnic material, the temperature in the chamber 108 reaches approximately 4,000° F. This relatively high temperature is more than sufficient to enable the hot combustion products and flame to melt the orifice plate 120 partially and increase the diameter of the orifice in the plate to the same diameter as the housing orifice 116.

The flame and hot combustion products heat the gas in the chamber 22. Also, gas generated by burning the body 46 of pyrotechnic material supplements the stored gas in the chamber 22. As the gas in the chamber 22 is heated, fluid pressure in the chamber increases. This results in an increased rate of flow of gas through the manifold assembly 16 to the diffuser 14 and from the diffuser into the inflatable occupant restraint.

In one specific embodiment of the invention, prior to operation of the actuator assembly 48, the fluid pressure in the chamber 22 was approximately 3,000 psi. Upon rupturing of the burst disk 52 by the piston 132, a flow of unheated gas from the chamber 22 caused the fluid pressure in the container 12 to decrease to approximately 2,500 psi. Ignition of the booster charge 44 and burning of the body 46 of pyrotechnic material resulted in the gas in the chamber 22 being heated to increase the pressure in the chamber to about 6,000 psi. Thus, the burning of the pyrotechnic material forming the body 46 was sufficient to cause the fluid pressure in the chamber 22 to increase substantially from its original pressure even though a portion of the gas had been released from the chamber. This resulted in a relatively large flow of gas to expand the occupant restraint.

Figure 2:
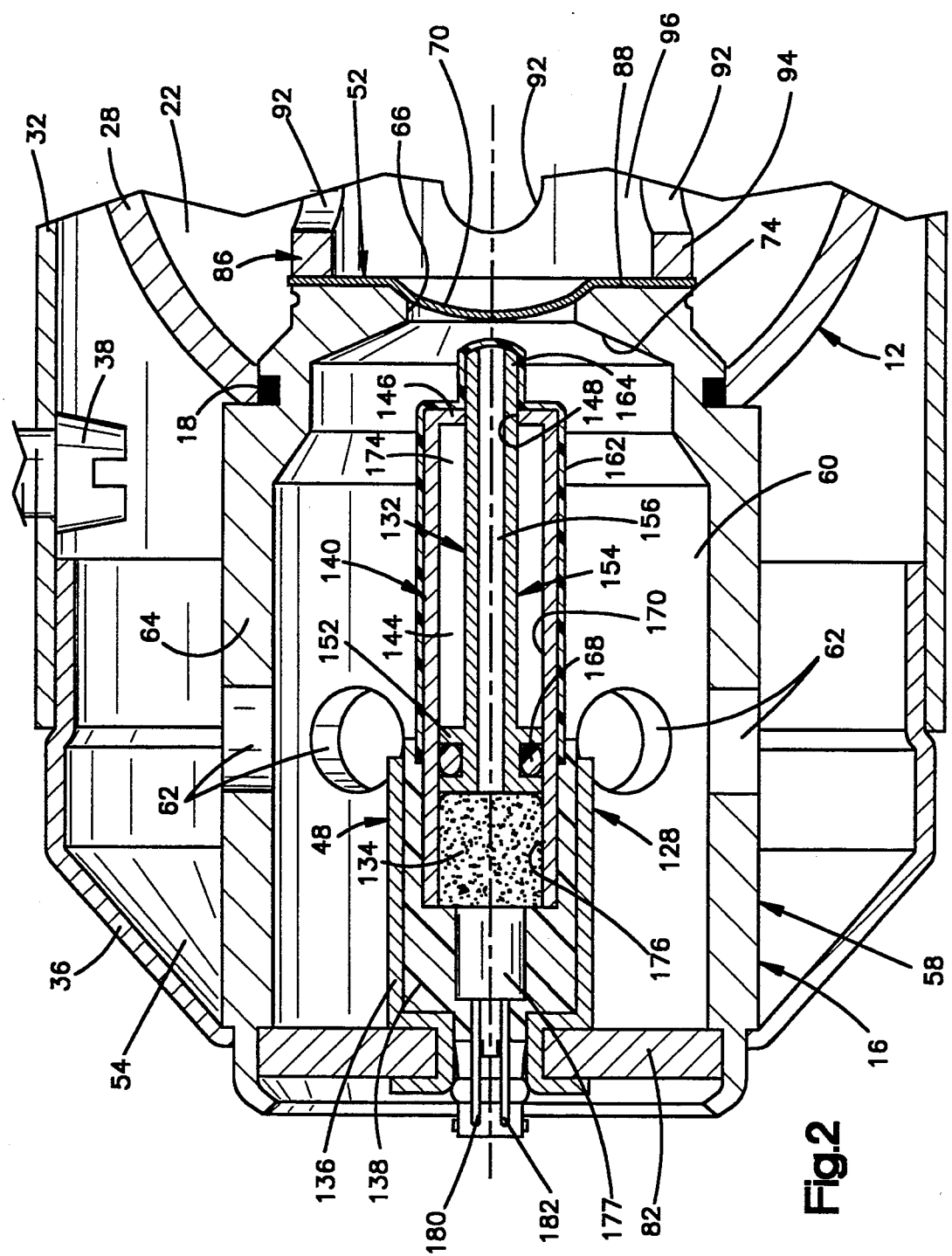
FIG. 2 is an enlarged partial sectional view of a portion of the inflator assembly of FIG. 1.

The piston 132 moves quickly from the retracted position of FIG. 2 to the extended position of FIG. 3. When the piston 132 reaches the extended position of FIG. 3, there may be a tendency for it to rebound back toward the retracted position of FIG. 2. In order to prevent this from occurring, the generally cylindrical opening 102 has a slight axial taper converging in a direction toward the booster charge 44. As the outer end portion 164 of the piston rod 154 moves into the opening 102, the axially tapering surfaces that define the opening 102 engage the outer end portion 164 of the piston rod 154 and block further axial movement of the piston 132. Therefore, even though the head end portion 152 of the piston 132 is spaced from the end flange 146 of the inner housing member 140 of the actuator assembly 48, the piston 132 is blocked against further rightward (as viewed in FIG. 3) movement by the axially tapering side wall surfaces around the opening 102. In addition, the axially tapered side wall surfaces grip the outer end portion 164 of the piston rod 154 to hold the piston 132 firmly in the extended position of FIG. 3.

First Modified Embodiment

Figure 4:
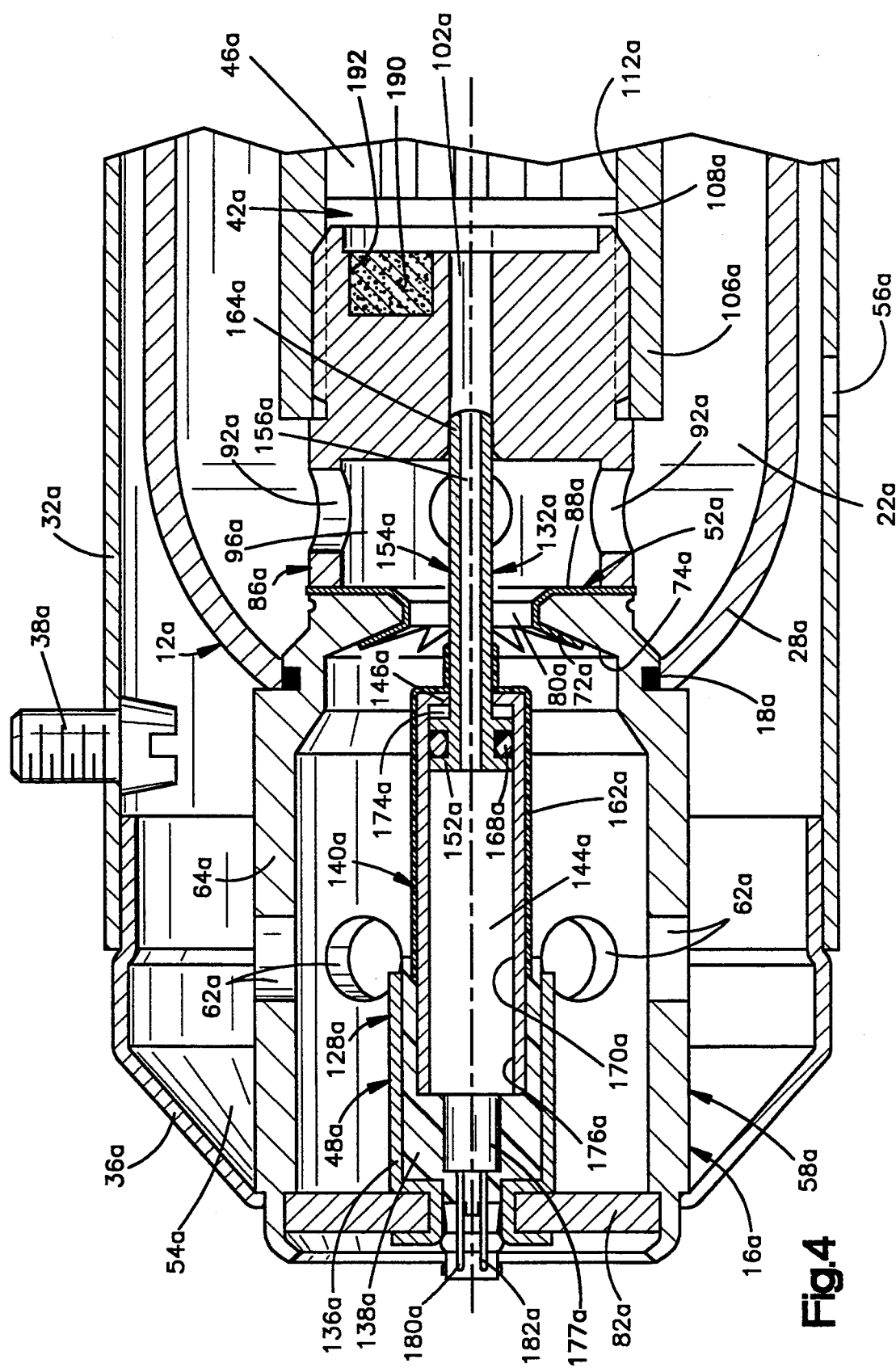
FIG. 4 is a partial sectional view, generally similar to FIG. 3, of a first modified embodiment of the present invention.

In the embodiment of the invention illustrated in FIGS. 1–3, the ignitable material 42 includes both a booster charge 44 and a body 46 of pyrotechnic material. In the embodiment of the invention illustrated in FIG. 4, a booster charge is not used. The embodiment of the invention illustrated in FIG. 4 is generally similar to the embodiment of the invention illustrated in FIGS. 1–3. Therefore, the same reference numbers are used to designate corresponding components of the inflator assembly, with the suffix letter "a" being added to identify the corresponding components of the first modified embodiment.

In the embodiment of the invention illustrated in FIG. 4, the ignitable material 42a is formed only by the body 46a of pyrotechnic material. The body 46a of pyrotechnic material has the same configuration and composition as the body 46 of pyrotechnic material utilized in the embodiment of the invention illustrated in FIGS. 1–3. However, an optional auto-ignition material 190 is included in the embodiment illustrated in FIG. 4. The auto-ignition material 190 is located in a cavity defined by a surface 192 of the metal holder 86a, and is thus located in fluid communication with the body 46a of pyrotechnic material. The auto-ignition material 190 ignites automatically when the ambient temperature reaches a predetermined elevated level, and then ignites the body 46a of pyrotechnic material. The temperature at which the auto-ignition material 190 ignites automatically is less than the temperature at which the body 46a would ignite automatically. In the event of a fire in or about the vehicle, the auto-ignition material 190 thus ignites automatically and causes the heat and pressure which result from burning of the body 46a to be released before excessive temperatures and pressures are reached.

Upon the occurrence of sudden vehicle deceleration, a pyrotechnic charge (not shown) in the actuator assembly 48a is ignited. As the pyrotechnic charge burns, the piston 132a is moved from a retracted position to the extended position shown in FIG. 4. As the piston 132a reaches the extended position shown in FIG. 4, a flow of combustion products resulting from burning of the pyrotechnic charge is conducted through the piston passage 156a and impinges directly on the body 46a of pyrotechnic material. The hot combustion products ignite the pyrotechnic material of the body 46a. As the body 46a of pyrotechnic material begins to burn, hot combustion products and flame are conducted into the chamber 22a containing the stored gas. The flame and hot combustion products heat the gas in the chamber 22a. In addition, gas generated by the burning of the body 46a of pyrotechnic material supplements the stored gas in the container 22a.

In the embodiment of the invention illustrated in FIGS. 1–3, movement of the piston 132 under the influence of the pyrotechnic charge 134 (FIG. 2) is stopped when the piston 132 reaches the extended position of FIG. 3. In the embodiment of the invention illustrated in FIG. 4, movement of the piston 132a is stopped by an axially tapered portion of the inner side surface 170a of the inner housing member 140a. Thus, the rightward (as viewed in FIG. 4) portion of the inner side surface 170a of the inner housing member 140a is axially tapered and converges as it extends toward the end flange 146a.

As the head end portion 152a of the piston 132a approaches the extended position shown in FIG. 4, the tapered portion of the inner side surface 170a of the inner housing member 140a frictionally engages the head end portion 152a of the piston to stop rightward (as viewed in FIG. 4) movement of the piston. Although the leading end portion 164a of the piston 132a extends into the opening 102a in the holder 86a, the sides of the holder defining the opening 102a are not tapered and do not grip the piston rod 154a to stop rightward movement of the piston 132a. Instead, radially inwardly tapered inner side surface 170a of the inner housing member 140a grips the head end portion 152a of the piston 132a to hold the piston 132a in the extended position shown in FIG. 4.

Second Modified Embodiment

Figure 5:
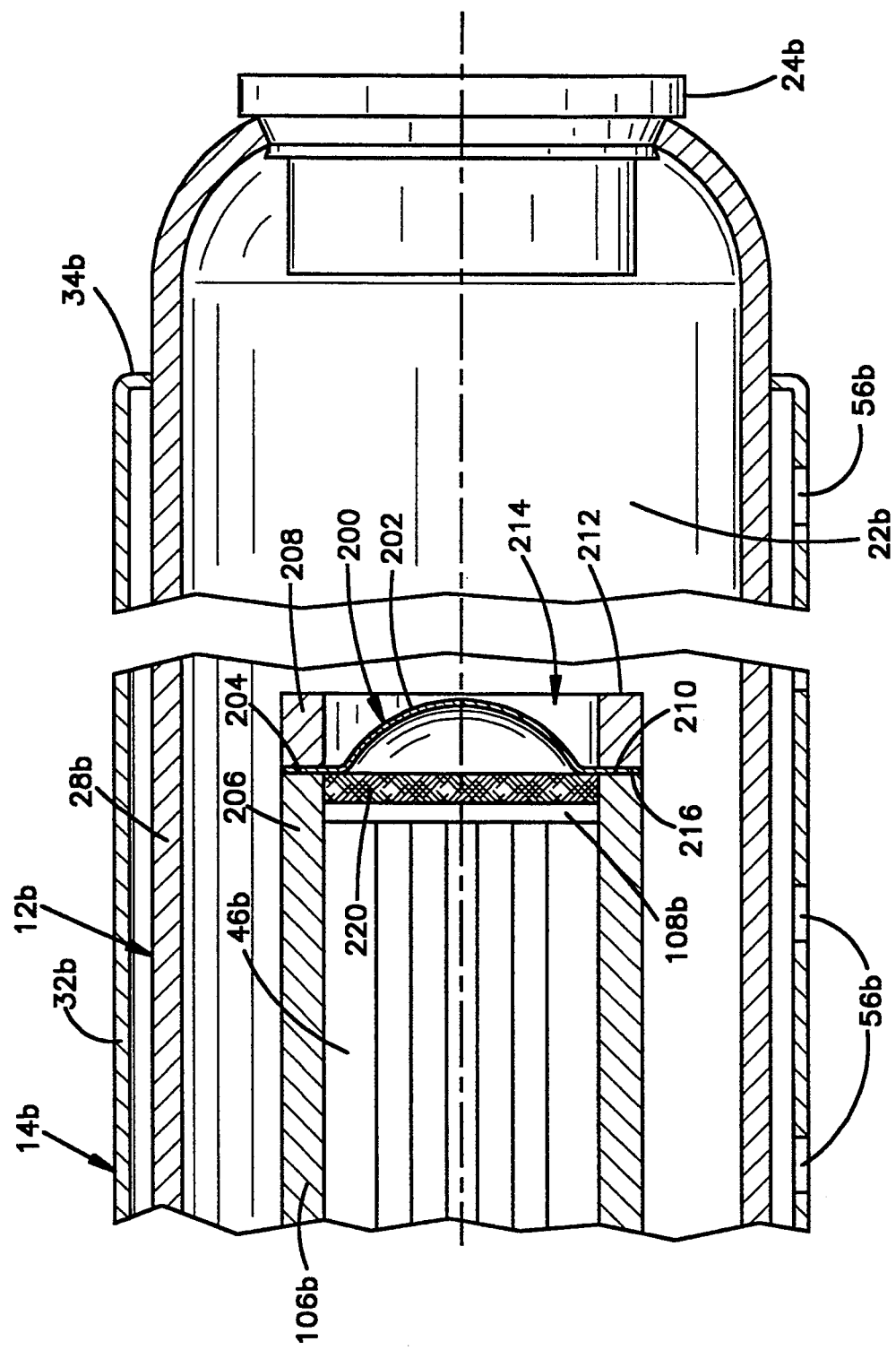
FIG. 5 is a partial sectional view of a second modified embodiment of the present invention.

A second modified embodiment of the invention is illustrated in FIG. 5. Like the first modified embodiment illustrated in FIG. 4, the second modified embodiment is generally similar to the embodiment illustrated in FIGS. 1–3. Therefore, the same reference numbers are again used to designate corresponding components of the inflator assembly, with the suffix letter "b" being added to identify the corresponding components of the second modified embodiment. FIG. 5 thus illustrates a modified cylindrical metal housing 106b. Specifically, FIG. 5 illustrates the end portion of the modified housing 106b which is located adjacent to the end cap 24b on the container 12b.

As described above with reference to FIG. 1, the end of the housing 106 is substantially closed except for the circular orifice 116. As shown in FIG. 5, the end of the modified housing 106b is sealed by a metal burst disk 200. The burst disk 200 is constructed like the burst disk 52 described above. The burst disk 200 thus has a domed central portion 202 and a flat annular rim portion 204.

The modified housing 106b has a main portion 206 and an end portion 208. The main portion 206 has an annular surface 210. The end portion 208 has an annular surface 212 which defines a circular opening 214. The end portion 208 also has an annular surface 216 which faces the annular surface 210 on the main portion 206. The rim portion 204 of the burst disk 200 is TIG welded to the adjacent annular surfaces 210 and 216, and is thus supported by the modified housing 106b in a position in which it seals the opening 214. A filter screen 220 is located between the body 46b of pyrotechnic material and the burst disk 200.

The inflator assembly including the modified housing 106b illustrated in FIG. 5 is otherwise constructed as described above with respect to the embodiment of FIGS. 1–3 or the embodiment of FIG. 4. The body 46b of pyrotechnic material is therefore ignited in response to sudden vehicle deceleration in the same manner that the body 46 or the body 46a is ignited. When the body 46b of pyrotechnic material burns, the temperature and pressure of the combustion products in the chamber 108b increase substantially above the temperature and pressure of the gas in the chamber 22b because the chamber 108b is closed and isolated from the chamber 22b by the burst disk 200. The other end of the chamber 108b is closed and isolated from the chamber 22b by the actuator assembly 48 or 48a, as shown in FIGS. 3 and 4. When the pressure of the combustion products in the chamber 108b reaches a predetermined elevated level, the burst disk 200 ruptures. The combustion products then flow past the ruptured burst disk 200 and into the chamber 22b through the opening 214.

Like the chambers 108 and 108a described above, the chamber 108b communicates with the chamber 22b through the passage 102 or 102a before the ignitable material 46b in the chamber 108b is ignited. The chamber 108b therefore contains a quantity of the stored gas at approximately 3,000 psi before the ignitable material 46b is ignited. However, unlike the chambers 108 and 108a, the chamber 108b is closed and isolated from the chamber 22b when the ignitable material 46b is ignited. The pressure in the chamber 108b therefore does not drop significantly below 3,000 psi when the stored gas begins to flow outward past the ruptured burst disk 52 or 52a.

As compared with the bodies 46 and 46a of pyrotechnic material in the open chambers 108 and 108a, the body 46b of pyrotechnic material in the closed chamber 108b burns faster under the greater level of pressure in the closed chamber 108b. The combustion products in the closed chamber 108b therefore reach elevated levels of temperature and pressure at a relatively earlier time. The pressure at which the burst disk 200 ruptures can be designed so that the combustion products mix with the stored gas in the chamber 22b at relatively greater levels of temperature and pressure. Additionally, the combustion products enter the chamber 22b through the opening 214 more suddenly than through the orifice 116. The gas in the chamber 22b is thus pressurized faster and/or to a greater degree in the second modified embodiment of the invention.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in inflating a vehicle occupant restraint, said apparatus comprising:
   means for defining a storage chamber for storing a gas under pressure which is releasable to inflate the vehicle occupant restraint;
   an ignitable material;
   actuator means for igniting said ignitable material;
   means for defining a combustion chamber in which said ignitable material is located;
   passage means for blocking communication of said combustion chamber with said storage chamber when said ignitable material is burning;
   said ignitable material producing combustion products when burning, said passage means including a surface defining an opening for communicating said combustion chamber with said storage chamber, said blocking means including a releasable member which blocks the passage of said combustion products through said opening, said releasable member being releasable to permit the passage of said combustion products from said combustion chamber to said storage chamber through said opening when said combustion products reach a predetermined elevated pressure.

2. An apparatus as defined in claim 1 wherein said releasable member is a first rupturable burst disk.

3. An apparatus as defined in claim 2 wherein said passage means further includes a passage communicating said combustion chamber with said storage chamber before said ignitable material is ignited, said blocking means further including a piston which is movable from a retracted position to an extended position, said piston blocking the flow of said combustion products from said combustion chamber to said storage chamber through said passage when said piston is in said extended position.

4. An apparatus as defined in claim 3 wherein said means for defining a storage chamber includes closure means for sealing said storage chamber when said piston is in said retracted position, said piston opening said closure means to release said stored gas from said storage chamber upon movement of said piston from said retracted position toward said extended position.

5. An apparatus as defined in claim 4 wherein said closure means comprises a second rupturable burst disk, said piston being movable through said second rupturable burst disk upon movement of said piston from said retracted position toward said extended position.

6. An apparatus for use in inflation of a vehicle occupant restraint, said apparatus comprising:
   first chamber means for holding a first ignitable material, said first ignitable material producing first combustion products when ignited;
   second chamber means for holding a second ignitable material, said second ignitable material producing second combustion products when ignited;
   third chamber means for storing a gas under pressure;
   means for conducting said first combustion products into said second chamber means to ignite said second ignitable material, said means for conducting said first combustion products including a piston which is movable from a retracted position to an extended position, said piston having a passage for directing said first combustion products to said second ignitable material when said piston is in said extended position; and
   said second chamber means further comprising means for conducting said second combustion products into said third chamber means to heat and pressurize said stored gas, said means for conducting said second combustion products including a surface defining an opening for communicating said second chamber means with said third chamber means and a releasable member which blocks the passage of said second combustion products through said opening, said releasable member being releasable to permit the passage of said second combustion products through said opening when said second combustion products reach a predetermined elevated pressure.

7. An apparatus as defined in claim 6 wherein said releasable member is a rupturable burst disk.

* * * * *

UNITED STATES PATENT AND TRADEMARK OFFICE
CERTIFICATE OF CORRECTION

PATENT NO. : 5,351,989
DATED : October 4, 1994
INVENTOR(S) : Joseph C. Popek and William F. McLeod It is certified that error appears in the above-indentified patent and that said Letters Patent is hereby corrected as shown below:

Column 11, line 66, after "for" insert --communicating said combustion chamber
with said storage chamber before said ignitable material
is ignited; and
    blocking means for--.

Signed and Sealed this

Eleventh Day of July, 1995

*Attest:*

BRUCE LEHMAN

*Attesting Officer*     *Commissioner of Patents and Trademarks*